United States Patent [19]

Spillman Jr.

[11] Patent Number: 4,874,941

[45] Date of Patent: Oct. 17, 1989

[54] OPTICAL DISPLACEMENT SENSOR WITH A MULTI-PERIOD GRATING

[75] Inventor: William B. Spillman Jr., Charlotte, Vt.

[73] Assignee: Simmonds Precision Products, Inc., Wilmington, Del.

[21] Appl. No.: 192,716

[22] Filed: May 11, 1988

[51] Int. Cl.⁴ ............................................. H01J 3/14
[52] U.S. Cl. ........................... 250/237 G; 250/231 SE; 250/226; 350/162.17
[58] Field of Search ................. 250/226, 227, 231 SE, 250/237 G; 356/374, 395, 354, 355, 356; 350/162.17, 162.24

[56] References Cited

U.S. PATENT DOCUMENTS

| | | | |
|---|---|---|---|
| 2,886,717 | 5/1959 | Williamson et al. | 250/220 |
| 3,419,330 | 12/1968 | Schneider | 356/106 |
| 3,549,239 | 12/1970 | Brienza et al. | 350/162 |
| 3,664,739 | 5/1972 | Pryor | 356/32 |
| 3,794,408 | 2/1974 | Ian et al. | 350/162.17 |
| 3,814,498 | 6/1974 | Tomlinson, III et al. | 350/162 |
| 4,215,576 | 8/1980 | Quick et al. | 73/356 |
| 4,275,296 | 6/1981 | Adolfsson | 250/227 |
| 4,330,211 | 5/1982 | Peterson et al. | 356/354 |
| 4,408,884 | 10/1983 | Kleinknecht et al. | 356/355 |
| 4,433,585 | 2/1984 | Levine | 356/356 |
| 4,528,448 | 7/1985 | Doggett | 250/231 SE |
| 4,583,852 | 4/1986 | Cassidy et al. | 356/152 |
| 4,660,288 | 4/1987 | Dangschat | 33/1 L |
| 4,677,293 | 6/1987 | Michel | 250/237 G |
| 4,689,485 | 8/1987 | McMurtry | 250/231 SE |
| 4,710,026 | 12/1987 | Magome et al. | 356/349 |
| 4,806,034 | 2/1989 | Plummer | 250/237 G |

Primary Examiner—David C. Nelms
Attorney, Agent, or Firm—Dale R. Lovercheck

[57] ABSTRACT

A transducer system that uses diffracted light energy in a transducer application analyzes light diffracted from a diffraction grating to provide an indication of displacement or other measurable environmental changes, such a temperature changes. In one form of the invention, a diffraction grating is fabricated from first and second gratings and has a step-wise change in the grating period at an inter-grating boundary. The grating is illuminated with broadband light that is diffracted as a function of the irradiated position on the grating with the wavelength of the diffracted light and the change in wavelength being a function of the diffraction grating position. In another form of the present invention, a diffraction grating is provided with a variable grating period that can vary linearly, exponentially, or in accordance with some other function with the wavelength of the diffracted light being a function of the relative displacement of the grating. Additionally, grating can be combined to provide a transducer that provides an output that can be compensated for temperature variations.

10 Claims, 6 Drawing Sheets

OPTICAL DISPLACEMENT SENSOR WITH A MULTI-PERIOD GRATING

BACKGROUND OF THE INVENTION

The present invention relates to optical sensors and, more particularly, to optical sensors and transducers for sensing various physical parameters using diffracted optical energy.

Diffraction gratings are typically formed by ruling parallel notches into the surface of a flat substrate with each notch serving as a source of scattered light. When light is transmitted through a grating, the emerging light includes periodic variations in the emerging wavefront. In contrast, when light is reflected from such a surface, the scattered light will arrive at some destination with a phase relationship that produces an interference pattern that varies in an amplitude and wavelength dependent manner.

Diffraction gratings have been used in various applications to assist in analyzing light energy consequent to an intended function. For example, U.S. Pat. No. 3,818,498 to Tomlinson discloses the use of a diffraction grating having a tapered period in which multi-wavelength light is separated into its constituent components to thus provide optical channel droppers, wavelength-selective beam splitters, reflectors, and filters, these devices of particular utility in the optical communications area. Similarly, U.S. Pat. No. 4,408,884 to Kleinknecht discloses using a diffraction grating to detect patterns that are formed on a silicon wafer as an incident to the quality control function.

Various optical sensing techniques have been developed to use light to measure displacements of a selected member as well as changes in an environmental characteristics, such as temperature or pressure. While diffraction gratings have been used in different applications, as mentioned above, the potential for using diffractions gratings in displacement and environmental sensing applications has not been fully realized.

SUMMARY OF THE INVENTION

In view of the above, it is an object of the present invention, among others, to provide optical transducers that utilize diffracted light provided by a diffraction grating mounted or formed upon a member so that relative displacement of the member can be determined.

It is another object of the present invention to provides an optical transducer having a substantially bi-state output that functions as an optical switch which changes states in response to displacement, temperature changes, or other physical changes.

It is another object of the present invention to provides an optical transducer that utilizes a composite diffraction grating to provide temperature compensated information in response to displacement of a selected member.

In view of these objects, and others, the present invention provides a transducer system that utilizes diffracted light energy in a transducer application to provide meaningful information as to a physical parameter. Optical energy is directed to a diffraction grating with a portion of the diffracted energy analyzed with regard to wavelength. Any displacement or other change, such as a temperature, affecting the diffraction characteristics of the grating can be determined as a function of the analyzed wavelength.

In one embodiment of the present invention, a diffraction grating is fabricated from first and second gratings have a step-wise change in the grating period at an inter-grating boundary. The grating is illuminated with broadband light that is diffracted as a function of the irradiated position on the grating. At least one order of the resultant diffracted light will be of a first wavelength when the first grating is irradiated, a second wavelength when the second grating is irradiated, and will switch between the first and second wavelengths as the boundary between the first and second gratings passes beneath the irradiating source light in response to displacement of the diffraction grating.

In another embodiment of the present invention, a diffraction grating is provided with a variable grating period that can vary linearly, exponentially, or in accordance with some other function. The diffraction grating is mounted upon a displaceable member and irradiated with source light to provide reflected and refracted light that changes in wavelength as a function of the displacement.

In still another embodiment of the present invention, a composite diffraction grating is defined by a first grating having a fixed line period and a second grating having a variable line period. The first grating is joined to or mounted adjacent the side of the second grating so that the lines of the first and second gratings are generally parallel. The grating period of the second grating can vary linearly, exponentially, or in accordance with some other predetermined function. The light diffracted by the composite diffraction grating will include wavelengths that correspond to the fixed grating period of the first grating and the variable grating period of the second grating. When the diffraction grating is displaced, the wavelength components of the diffracted light will have a constant wavelength component that is caused by reflection and diffraction from the first grating and a varying wavelength that is caused by diffraction and reflection from the second grating. Should the temperature of the system vary, the wavelength of the reflected light from the first grating, as well as that from the second grating, will vary in a temperature dependent manner with the variation in the refracted wavelength from the first grating available as a compensation value for the variation with temperature of the second diffraction grating.

The present invention advantageously provide apparatus by which accurate displacement measurements and measurements of other physical parameters can be achieved.

Other objects and further scope of applicability of the present invention will become apparent from the detailed description to follow, taken in conjunction with the accompanying drawings, in which like parts are designated by like reference characters.

DESCRIPTION OF THE PREFERRED EMBODIMENT

Figure 1:
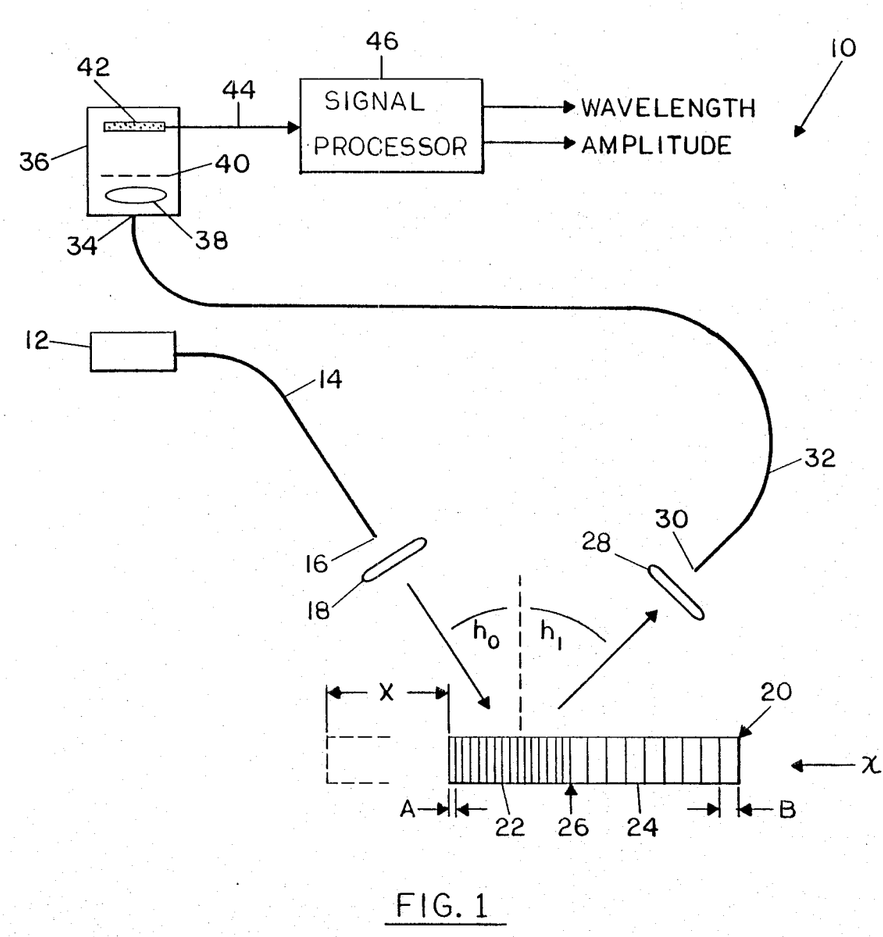
FIG. 1 illustrates a first embodiment of the present invention.

A preferred embodiment of an optical transducer system in accordance with the present invention is illustrated in FIG. 1 and designated generally therein by the reference character 10. As shown, a broadband optical source 12 provides light in a desired spectral range, such as the infrared, visible, and ultraviolet range, for use in effecting the transducer determination. The light emitted from the broadband source 12 passes through an optical fiber 14 and is directed from an end 16 of the optical fiber 14 into a lens 18. The light is focused by the lens 18 at an angle $H_0$ onto the surface of a reflective diffraction grating 20 and is reflected from the diffraction grating 20 and analyzed as described below.

The reflective diffraction grating 20 is fabricated from a first grating 22 having a line spacing period A and a second grating 24 having a period B that is different from the period A. In FIG. 1, the lines and their spacing are symbolically represented by the closely adjacent parallel and vertical lines. The two gratings 22 and 24 are joined so that the grating lines of the first and second gratings 22 and 24 are substantially parallel to one another with the juncture or interface defined as a boundary 26. The diffraction grating 20 can be fabricated by severing or cutting each grating 22 and 24 (or replica) at a mid-line position and mounting the gratings on a common substrate (not shown in FIG. 1) with the prepared ends in an abutting relationship with one another to define the boundary 26. In general, the difference between the periods A and B should be sufficient to achieve the desired result, as explained below, with a larger difference generally presenting a higher signal-to-noise ratio in the output signal. For a line density of several thousand lines per centimeter for the first diffraction grating 22, a line density of one-half or twice that value for the second grating 24 is satisfactory. In addition to fabricating the diffraction grating 20 as a composite from the first and second diffraction gratings mounted on a common substrate, the diffraction grating 20 can be fabricated by ruling a section of a substrate (e.g., aluminum-coated glass) at the first period and ruling a second, contiguous section of the substrate at the second period to define an transition or boundary 26 where the period changes in a step-wise manner.

The light focussed by the lens 18 onto the diffraction grating 20 is reflected towards a lens 28 at an angle $H_1$ and focused into an end 30 of an optical fiber 32. The reflected light is conveyed by the optical fiber 32 and presented from an end 34 thereof to a detector 36. The detector 36 is designed to provide an electrical output that corresponds to the light provided from the optical fiber 32 and includes a lens 38 which focuses the reflected light onto a transmission diffraction grating 40. The light is diffracted by the diffraction grating into various orders (i.e., M = 0, −1, +1, . . .) that are detected by a CCD (charge-coupled device) array 42. The CCD array 42 is typically defined by a two-dimentional array of photo-responsive cells with groups of the cells organized into line channels. Upon exposure to a selected image, the irradiated cells will form a charge that can be shifted to an output for analysis. Thus, the CCD array 42 can provide an output of selected areas that are subjected to exposure as well as intensity of the exposure. Since the transmission diffraction grating 40 will diffract the light from the optical fiber 32 onto selected areas of the CCD array 42 as a function of wavelength, the output of the CCD array 42 also functions to determine wavelength or changes in wavelength of the light provided from the diffraction grating 20. The light detected by the CCD array 42 is converted into an electrical signal that is supplied to an output 44 for processing by a signal processor 46.

In the organization of the components presented in FIG. 1, the diffraction grating 20 is movably mounted for displacement toward the left in the horizontal direction as represented by the directional arrow x. In the position shown in FIG. 1, the light focussed by the lens 18 irradiates only the surface of the first grating 22 and, as is known in the art, will reflect light at a wavelength associated with the grating period A and at a relatively constant intensity. The light introduced into the detector 36 is diffracted by the diffraction grating 40 which irradiates corresponding areas of the CCD array 42, which, in turn, provides an output at 44 that is a function of the period A line spacing of the grating 22. In an analogous manner, if the light focussed by the lens 18 strikes only the surface of the second grating 24, the reflected light will have a second, different wavelength associated with the period B of the second grating 24. The light is also diffracted by the diffraction grating 40 which irradiates different corresponding areas of the CCD array 42 to provide another signal output at 44, this latter signal being a function of the period B line spacing of the grating 22. As can be appreciated, the different wavelength output signals can be discriminated in the signal processor 46.

When the diffraction grating 20 is displaced to the left in FIG. 1, the light reflected from the first grating 22 will illuminate a corresponding first area of the CCD array 42 to produce a first signal, and as the input light from the lens 18 irradiates the boundary 26, the reflected light will include light refracted at the first wavelength consequent to the first period A and light refracted at a another wavelength consequent to the second period B, the latter optical energy illuminating another area of the CCD array 42. As the diffraction grating 20 continues to move leftward, the portions of the first and second gratings 22 and 24 on opposite sides of the boundary 26 will be equally irradiated with light from the lens 16 to produce reflected light that includes both wavelengths at substantially the same radiant intensities with the CCD array 42 providing the corresponding signals. As can be appreciated by those skilled in the art, the output of the detector 36 will likewise go through a transition representative of the relative displacement of the boundary 26 through the irradiated area. The ultimate resolution of the diffraction grating 20 is a function of the spot size of the light provided from the lens 18 and, for small spot sizes, the output of the detector 36 will be essentially bi-state so that the optical displacement system 10 functions in a manner analogous to a switch.

The wavelength of the light reflected at an angle $H_1$ from the surface of the diffraction grating 20 can be determined using the grating equation, as follows:

$$\sin H_1 = mL/s + \sin H_0 \qquad \text{Eq. 1}$$

where:
L is the wavelength;
m is the diffraction order of the maximum; and
s is the grating period.

By mounting the lenses 18 and 28 and the optical fibers 14 and 32 on a stationary support (not shown) with respect to the diffraction grating 20, the angles $H_0$ and $H_1$ will be constant. The grating period s for each of the first and second gratings are fixed at periods A and B and, accordingly, the diffraction order sensed can be predetermined and the wavelengths and associated amplitudes of the light that is reflected toward the lens 28 can be determined after detection by the CCD array 42. Since the desired information in the refracted light of the diffraction grating 20 is effectively wavelength modulated, the system of FIG. 1 is well suited for use in applications where significant broadband background light is present.

Figure 2:
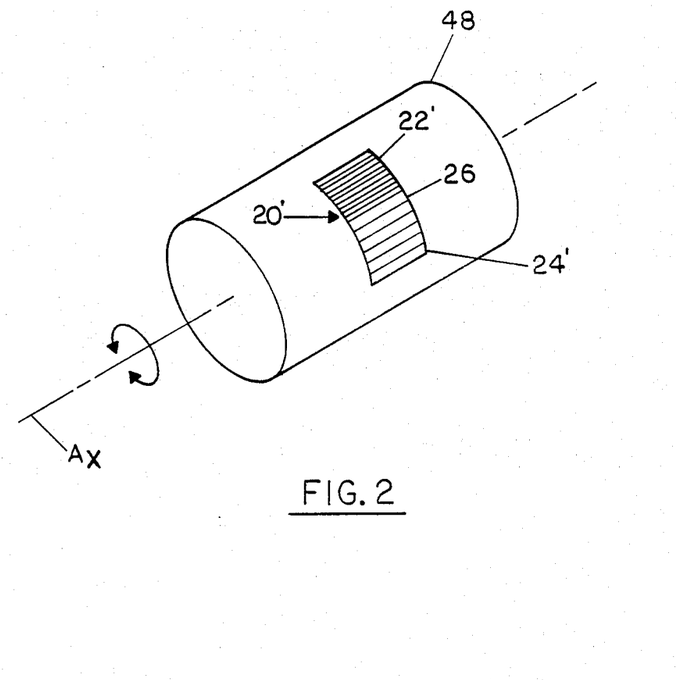
FIG. 2 illustrates a first variation of the embodiment of FIG. 1.
Figure 2A:
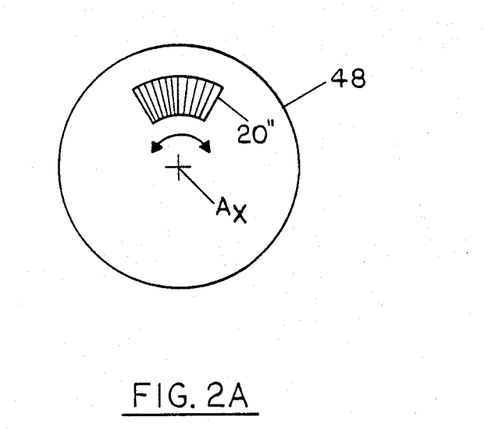
FIG. 2A illustrates a second variation of the embodiment of FIG. 1.

The embodiment of FIG. 1 presents a flat diffraction grating that affects the source light from the lens 18 and is well suited for use in a linear displacement context. In addition, the configuration of the diffraction grating 20 can be changed for applications involving angular displacement. For example and as shown in FIG. 2, a diffraction grating 20' is formed as a curvilinear segment and mounted on a peripheral portion of a cylindrical shaft 48 that is mounted for rotation about an axis $A_x$. The first grating 22' and the second grating 24' are placed so that movement of the diffraction grating 20' will cause a change in the intensity of and the wavelengths sensed by the detector (not shown in FIG. 2) and thereby act as a bi-state switch that is sensitive to rotary motion. As shown in FIG. 2A, an alternate embodiment for sensing rotary motion of the structure shown in FIG. 2 includes a diffraction grating 20" mounted on an axial end face of the cylindrical shaft 48. The diffraction grating 20" is formed so that the lines are radially aligned. As can be appreciated, the effective period will vary as a function of the radius from the axis of rotation $A_x$. Accordingly, it is preferably that the diffraction grating 20" be mounted concentrically with regard to the axis $A_x$.

Figure 3:
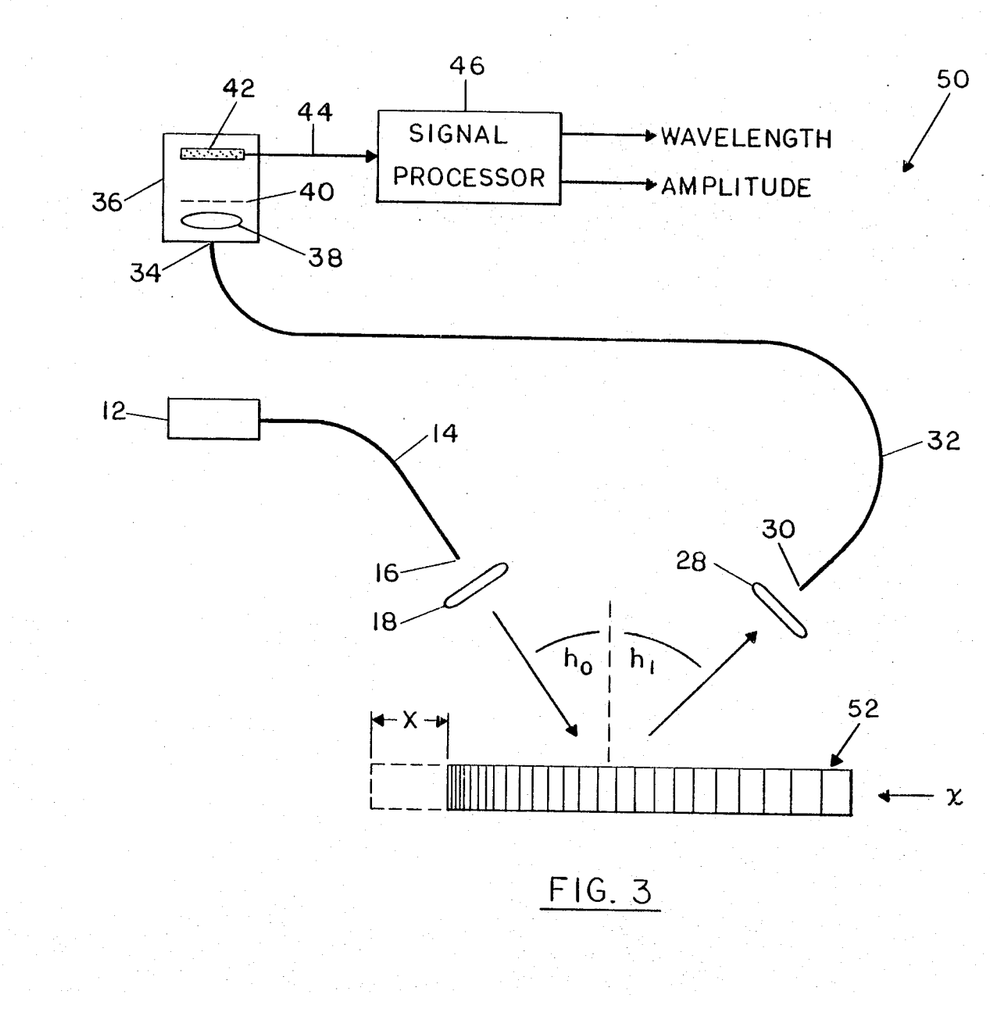
FIG. 3 illustrates a second embodiment of the present invention.

A second embodiment of the present invention is shown in FIG. 3 in which like parts are designated by like reference characters and is designated generally therein by the reference character 50. As shown in symbolic fashion by the parallel spaced lines, a reflective diffraction grating 52 is provided with a variable grating period that can vary linearly, exponentially, or in accordance with some other function. The diffraction grating 52 can be fabricated by ruling a substrate at an initial line period of several thousand lines per centimeter and decreasing the period slightly with each successively ruled line to thus increase the line density in a successive manner.

Figure 3A:
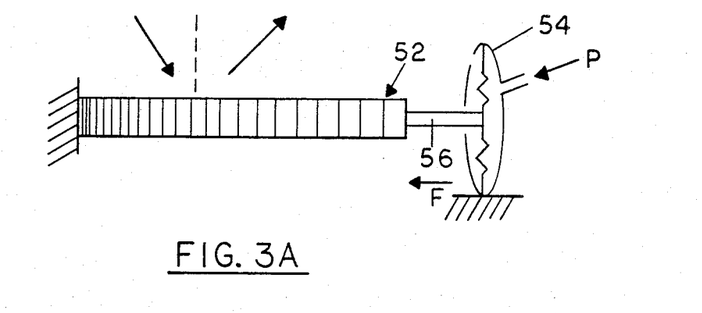
FIG. 3A illustrates a first variation of the embodiment of FIG. 3.

Displacement of the grating 52 in the x direction will cause the wavelength of the reflected and refracted light to change, depending on the grating period that is irradiated by the light presented from the lens 18. The variation in wavelength is sensed by the detector 36 which, in turn, provides a corresponding electrical output that is a function of the change in wavelength and is an accurate indication of relative displacement, in contrast to the bi-state output provided by the embodiment of FIG. 1. As shown in the graphical illustration of FIG. 3C for for one embodiment of the FIG. 3, the wavelength changes in a substantially linear manner at a rate of approximately 200 nm./cm. relative displacement.

Figure 3B:
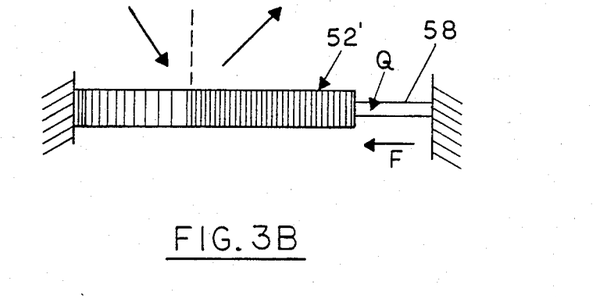
FIG. 3B illustrates a second variation of the embodiment of FIG. 3.
Figure 3C:
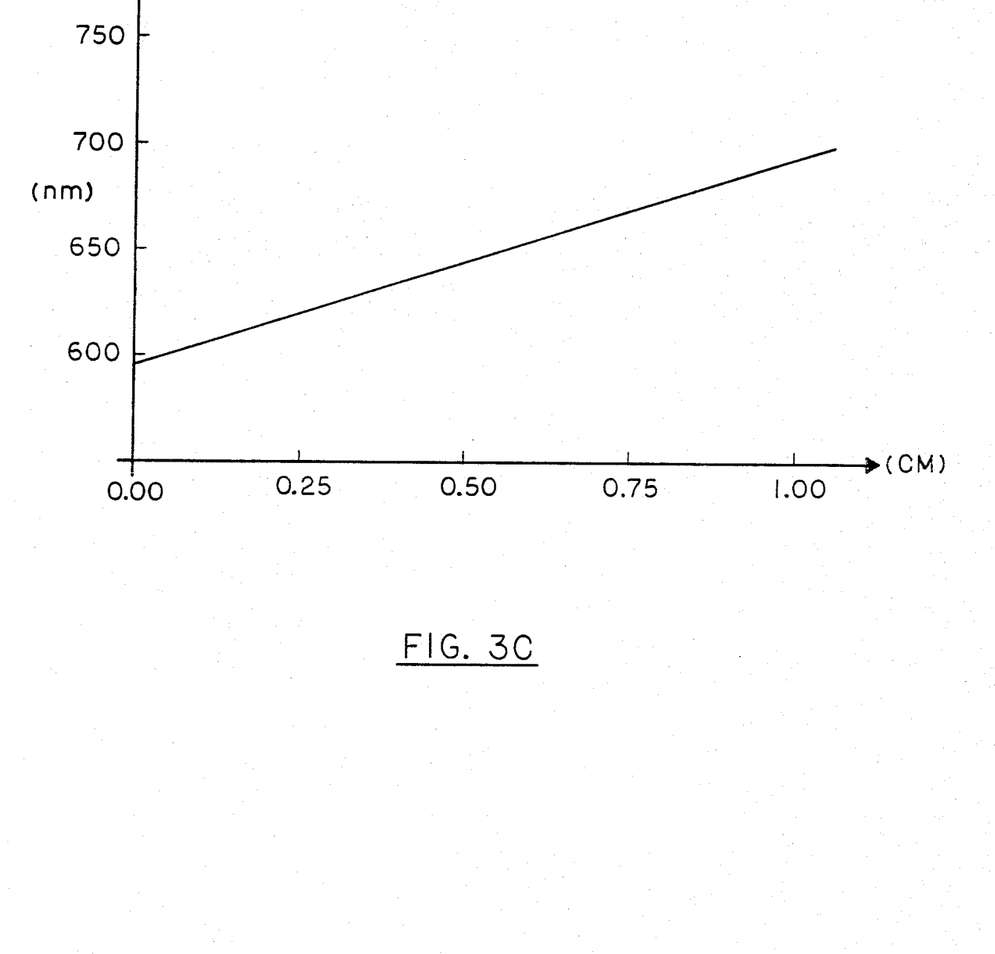
FIG. 3C is a graphical illustration representing the relationship between diffracted wavelength and relative displacement for the embodiment of FIG. 3 in which the ordinate represent wavelength in nanometers and the abscissa represents absolute displacement in centimeters.

In the context of the FIG. 3 embodiment, the relative movement of the diffraction grating 52 can be provided by a movable member upon which the grating 52 is mounted or by a physical force acting on the diffraction grating 52, e.g., small displacements caused by temperature, pressure, or stress/strain changes. In this latter context and a shown in FIG. 3A, a pressure transducer 54, such as a diaphragm mounted in a chamber and connected to the diffraction grating 52 by a push rod 56, can be used to apply a compressive force F to the diffraction grating 52 in response to pressurization P to effect physical compression of the grating 52 and a corresponding electrical signal output. In FIG. 3B, a thermal actuator 58 fabricated from material (i.e., copper, aluminum) that expands and contracts in response to temperature Q is mounted to apply a compressive force to a diffraction grating 52' to thus provide an output signal that varies with temperature. In the embodiment of FIG. 3B, the diffraction grating 52' is presented with both the variable period line spacing of the diffraction grating of FIG. 1 and a contiguous fixed period line spacing of the diffraction grating FIG. 2, this configuration representing a functional combination that provides a varying wavelength output that switches to a fixed wavelength output.

Figure 4:
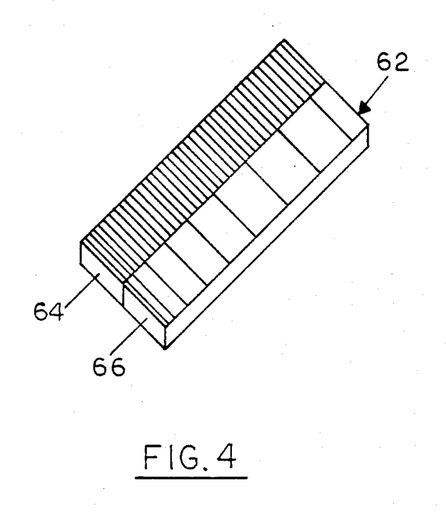
FIG. 4 illustrates a composite diffraction grating for a third embodiment of the present invention.

A composite diffraction grating of a third embodiment of the present invention is presented FIG. 4 and designated by the reference character 62. The composite diffraction grating 62 is defined by a first grating 64 having a fixed line period and a second grating 66 having a variable line period as described above for the reflective diffraction grating 52 of FIG. 3. As shown, the first grating 64 is joined to or mounted adjacent the side of the second grating 66 so that the lines of the first and second gratings 64 and 66 are generally parallel. The grating period of the second grating 66 can vary linearly, exponentially, or in accordance with some other predetermined function. The composite grating 64 is employed in the optical circuit of FIG. 1, for example, so that the source light provided through the lens 18 irradiates both the first grating 64 and the second grating 66. The light reflected into the lens 28 will include wavelengths that correspond to the fixed grating period of the first grating 64 and the variable grating period of the second grating 66. When the diffraction grating 62 is displaced, the wavelength components of the light reflected to the lens 28 will have a constant wavelength component that is caused by reflection and diffraction from the fixed period of the first grating 64 and a varying wavelength component that is caused by diffraction and reflection from the varying period of the second grating 66.

Figure 5:
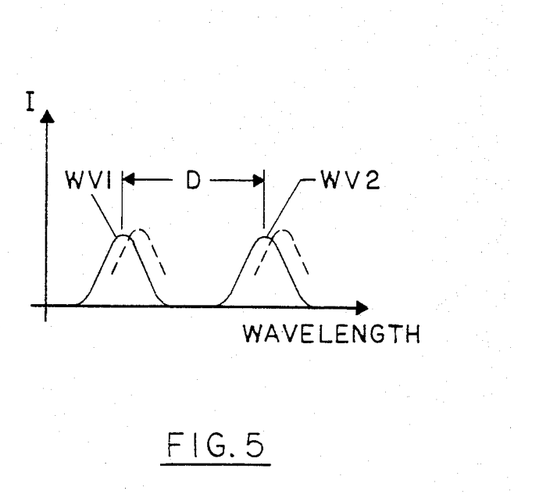
FIG. 5 is an idealized graphical illustration of the output signals obtained from the composite diffraction of FIG. 4 in which the ordinate represents signal amplitude or intensity and the abscissa represents wavelength.

An idealized graphical representation of the wavelength outputs $WV_1$ and $WV_2$ caused by the first and second gratings 64 and 66 is shown in FIG. 5 in which the ordinate represents signal amplitude or intensity and the abscissa represents wavelength. As shown, a peak $WV_1$ will have a relatively fixed wavelength for any displacement of the composite diffraction grating 62, and a peak $WV_2$ that will vary in wavelength as a function of the physical displacement of the composite diffraction grating 62. Thus, the first diffraction grating 64 functions as a baseline reference for the wavelength varying light provided by the second grating 66 in response to displacement. For any constant temperature application, the wavelength of the peak $WV_1$ shown in FIG. 5 will remain relatively fixed. Should the temperature of the system vary, the wavelength of the reflected light from the first grating 64, as well as that from the second grating 66, will vary in a temperature dependent manner. The variation in the refracted wavelength from the first grating 64 as a function of temperature is thus available as a compensation value for the variation with temperature and relative displacement for the output of the diffraction grating 66. Compensation can be effected by subtracting the change in wavelength for the first wavelength peak $WV_1$ for the change in temperature $\delta T$ between a first temperature T1 and a second temperature T2 (i.e., $WV_1[T1] - WV_1[T2]$) from the change in wavelength for the second wavelength peak $WV_2$ for that change in temperature $\delta T$.

Figure 6:
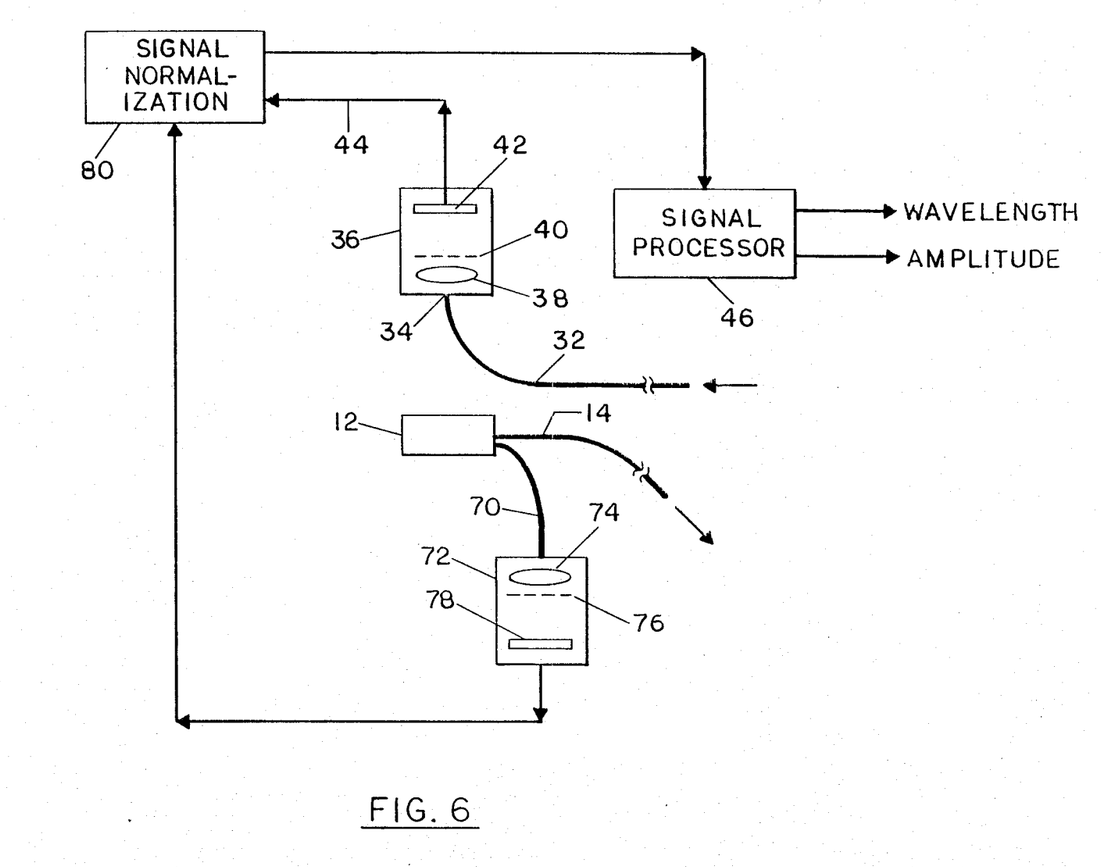
FIG. 6 is a schematic block diagram of a system for compensating the signal output for change with time or temperature of the source light spectrum.

In addition to compensation for temperature variation, as discussed above in connection with FIGS. 4 and 5, the signal output can be compensated for variations with time of the spectrum of the broadband light source 12, these changes introducing errors in the system. As shown in FIG. 6, a portion of the light from the light source 12 is provided through a fiber 70 to a detector 72 that includes a lens 74, a diffraction grating 76, and a CCD array 78. The detector 72 functions in a manner analogous to the detector 36 as described above. The source light is analyzed by the detector 72 and presented to a normalizer 80 that accepts the output 44 from the detector 36 and normalizes the output 44 relative the output of the CCD array 78 for presentation to the signal processor 46.

In the embodiments described above, reflection gratings have been used to affect the source light; as can be appreciated, transmission gratings can likewise be used.

As will be apparent to those skilled in the art, various changes and modifications may be made to the illustrated optical grating transducers of the present invention without departing from the spirit and scope of the invention as determined in the appended claims and their legal equivalent.

What is claimed is:

1. An optical displacement sensor, comprising:
   a diffraction grating having a first grating period and a different second grating period;
   means for irradiating said diffraction grating at a predetermined angle with broadband optical radiation;
   means for detecting a change in a characteristic of the light diffracted from said diffraction grating as a consequence of irradiation of the boundary between the first and second gratings as the boundary is displaced relative the irradiating light, said detecting means having a second optical fiber having an input end and an output end;
   means for focusing the diffracted light into said input end of said second optical fiber; and
   means coupled to said output end of said second optical fiber for determining at least the wavelength of the diffracted light.

2. The optical displacement sensor according to claim 1, wherein said diffraction grating is a reflective diffraction grating.

3. The optical displacement sensor according to claim 1, wherein the means for irradiating comprises:
   an optical source for producing broadband light;
   an optical fiber having an input coupled to said optical source and having an output; and
   means for directing the broadband light from said output of said optical fiber onto said diffraction grating at said predetermined angle.

4. The optical displacement sensor according to claim 1, wherein the wavelength determining means comprises:
   a transmission diffraction grating;
   means for focussing the light emitted from said output end of said second optical fiber onto said transmission diffraction grating; and
   an array of light-responsive devices for detecting the diffracted light, the wavelength of the diffracted wave sensed as a function of selected ones of the light-responsive devices irradiated by the diffracted light.

5. An optical displacement sensor, comprising:
   a diffraction grating having a linearly variable grating period;
   means for irradiating said diffraction grating at a predetermined angle with broadband optical radiation; and
   means for detecting a change in a characteristic of the light diffracted from said diffraction grating as a consequence of the displacement of the diffraction grating relative to the irradiating light.

6. The optical displacement sensor according to claim 5 wherein said diffraction grating is a reflective diffraction grating.

7. The optical displacement sensor according to claim 3, wherein the means for irradiating comprises:
   an optical source for producing broadband light;
   an optical fiber having an input coupled to said optical source and having an output; and
   means for directing the broadband light from said output of said optical fiber onto said diffraction grating at said predetermined angle.

8. An optical displacement sensor, comprising:
   a diffraction grating having a variable grating period;
   means for irradiating said diffraction grating at a predetermined angle with broadband optical radiation;
   means for detecting a change in a characteristic of the light diffracted from said diffraction grating as a consequence of the displacement of the diffraction grating relative to the irradiating light said detecting means having a second optical fiber having an input end and an output end;
   means for focussing the diffracted light into said input end of said second optical fiber; and
   means coupled to said output end of said second optical fiber for determining at least the wavelength of the diffracted light.

9. The optical displacement sensor according to claim 8, wherein the wavelength determining means comprises:
   a transmission diffraction grating;

means for focussing the light emitted from said output end of said second optical fiber onto said transmission diffraction grating; and an array of light-responsve devices for detecting the diffracted light, the wavelength of the diffracted wave sensed as a function of selected ones of the light-responsive devices irradiated by the diffracted light.

10. An optical displacement sensor comprising:

a first diffraction grating having a variable grating period;

a second diffraction grating having a fixed grating period;

means for irradiating said first and second diffraction gratings with broadband optical radiation; and means for detecting light refracted from said first diffraction grating and said second diffraction grating, said means detecting a change in a characteristic of the light diffracted from the first diffraction grating as a consequence of displacement of the first diffraction grating relative the irradiating light and compensating for any error in the detected characteristic common to both said first and second diffraction gratings using the detected light from said second diffraction grating.

* * * * *

UNITED STATES PATENT AND TRADEMARK OFFICE
CERTIFICATE OF CORRECTION

PATENT NO. :  4,874,941

DATED :  October 17, 1989

INVENTOR(S) :  SPILLMAN

It is certified that error appears in the above-identified patent and that said Letters Patent is hereby corrected as shown below:

```
Column 1, Lines 49 and 50,  "  provides  "

should read  --  provide  --

Column 1, Lines 54 and 55,  "  provides  "

should read  --  provide  --

Column 6, Line 9,  "  for for  "

should read  --  for  --

Column 6, Line 19,  "  a  "

should read  --  as  --
```

UNITED STATES PATENT AND TRADEMARK OFFICE
CERTIFICATE OF CORRECTION

PATENT NO. : 4,874,941

DATED : October 17, 1989

INVENTOR(S) : Spillman

It is certified that error appears in the above-identified patent and that said Letters Patent is hereby corrected as shown below:

Column 9, claim 9, line 4, "light-responsve" should read --light-responsive--

Signed and Sealed this

Eighteenth Day of December, 1990

Attest:

HARRY F. MANBECK, JR.

*Attesting Officer*          *Commissioner of Patents and Trademarks*